United States Patent [19]
Van Allen

[11] 3,786,737
[45] Jan. 22, 1974

[54] PHOTOGRAPHIC FLASH ASSEMBLY
[75] Inventor: David E. Van Allen, Malden, Mass.
[73] Assignee: Polaroid Corporation, Cambridge, Mass.
[22] Filed: July 17, 1972
[21] Appl. No.: 272,717

Related U.S. Application Data
[63] Continuation of Ser. No. 41,681, May 25, 1970, which is a continuation of Ser. No. 743,744, July 10, 1968, abandoned.

[52] U.S. Cl............... 95/11 L, 95/11.5, 240/1.3
[51] Int. Cl. .......................................... G03b 19/00
[58] Field of Search... 95/11 R, 11 L, 11.5; 240/1.3; 339/147 P

[56] References Cited
UNITED STATES PATENTS
3,609,649 9/1971 Rigolini........................... 95/11.5 X
3,559,150 1/1971 Iwaki et al...................... 339/147 P
3,407,717 10/1968 Ernisse......................... 339/147 P X
3,491,667 1/1970 Land................................. 95/11 R
3,398,389 8/1968 Fischer et al................ 339/147 P X OTHER PUBLICATIONS
German Utility Patent Application P.A. 502,927 9/23/65

Primary Examiner—Richard L. Moses
Attorney, Agent, or Firm—Gerald L. Smith

[57] ABSTRACT
This disclosure relates to flash photography and particularly to apparatus for releasably mounting a multi-lamp photoflash unit on a photographic camera to facilitate sequential presentation of each lamp in the unit to a predetermined location for ignition in timed relationship to photographic exposure.

5 Claims, 3 Drawing Figures

PHOTOGRAPHIC FLASH ASSEMBLY

This application is a continuation of U.S. Patent application Ser. No. 41,681 filed May 25, 1970 which, in turn, is a continuation of application Ser. No. 743,744 filed July 10, 1968 and now abandoned.

SUMMARY OF THE INVENTION

This invention contemplates apparatus usable in flash photography for releasably mounting a multilamp photoflash unit on a photographic camera. The apparatus is mounted on the camera fpr rotation relative thereto and is engageable with the multilamp unit for rotatably connecting the unit to the camera. Rotation of the apparatus sequentially positions each lamp of the multilamp unit in a predetermined location for ignition in timed relationship with exposure producing operation of the camera.

The mounting apparatus may include a rotatably mounted base having projecting means and leaf-like members extending therefrom. The projecting means and the leaf-like members cooperate with a connection portion of a multilamp assembly for rotatably mounting the multilamp assembly on the camera.

Figure 1:
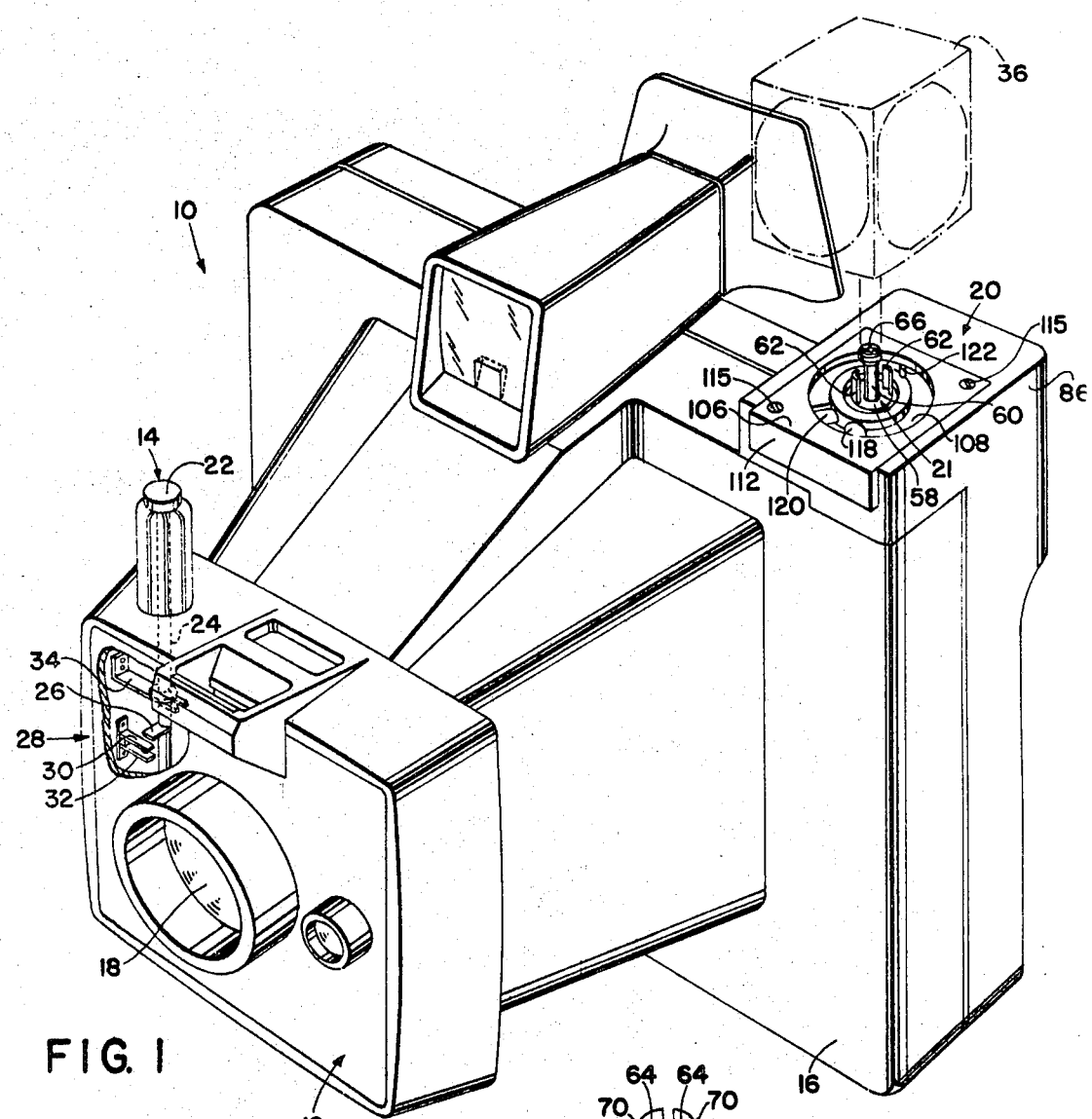
FIG. 1 is a perspective view of a photographic camera incorporating a preferred embodiment of this invention.

In a preferred embodiment, the connecting portion defines a hollow post having a plurality of spaced radially extending lugs and the projecting means defines a bifurcated projecting member for insertion into the hollow post and capable of exerting a radial outwardly directed force against the inner surface of the post for facilitating releasable retention of the multilamp unit on the camera. The leaf-like members are engageable with the lugs for rotating the multilamp assembly comprises a generally cubic housing supporting a photoflash lamp, 38, and an individual reflector 40 in each of four peripheral faces designated by numeral 42. The unit is provided with support 44 defining contact supporting ring 46 and connecting portion 48. The contact ring locates lead-in wires 50 from each lamp for selective contact with a pair of cooperating terminals included within the photographic flash assembly, as will hereafter be described. The connecting portion includes hollow post 52 and four radial outwardly extending lugs 54 spaced uniformly about the outward extremity of the post. Hollow post 52 defines engageable shoulder 56 near the end thereof which abuts support 44.

Photographic flash assembly 20 includes rotatably mounted member 21, portion 86 of camera body 16, cover 106 and circuit means 130. Member 21 has a base 58 from which bifurcated projecting member 60 and a pair of leaf-like members 62 extend. The bifurcated projecting member defines a pair of like prongs 64 each of which includes detent means 66. The detent means comprises an outwardly extending enlargement of each prong adjacent the end of the prong remote from base 58. Each outwardly extending portion is characterized by beveled surfaces 68 and 70 disposed on either side of a surface 72. Base 58 includes gear 74, journals 76 and 78 and extension 80 having a square cross-sectional configuration.

Portion 86 rotatably mounts member 21 and supports cantilever springs 82, gear 84 and switch 124. Portion 86 of the camera body defines open chamber 88 having a pair of peripheral grooves 90 and 92. Grooves 90 and 92 locate plates 94 and 96, respectively. The plates include circular openings 98 and 100 which form bearing supports cooperatively associable with journals 76 and 78 respectively, for rotatably mounting member 21. Springs 82 extend from a portion of the inner surface of open chamber 88 beneath plate 96 for cooperation with extension 80; gear 84 is rotatably mounted between plates 94 and 96 on axle 102 for cooperation with gear 74. Opening 104 in portion 86, between plates 94 and 96, permits a part of gear 84 to extend through a wall of portion 86 for manual operation. Rotation of gear 84 rotates gear 74 and springs 82 to operate with extension 80 during rotation for indexing member 21 through a series of ninety-degree turns.

Cover 106 includes circular channel 108, opening 110, and depending portion 112 including grooves 114 and 116. The cover mounts terminals 118 and 120 in a forward portion of channel 108 and supports elongated pin 122 for cooperation with unit 36 and switch 124. Cover 112 is fastened to portion 86 by any suitable means, for example, by screws 115 which engage the cover, pass through plates 94 and 96 and are threaded into portion 86.

Figure 3:
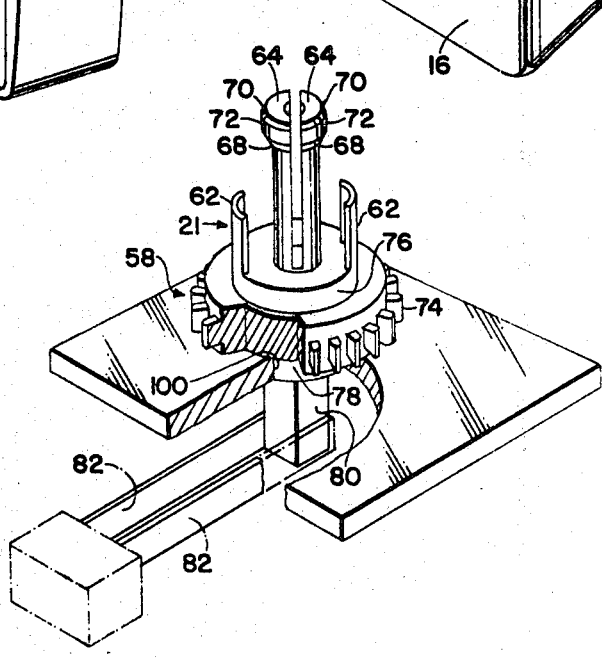
FIG. 3 is an enlarged, partially cut away, perspective view of a portion of the apparatus of FIG. 2.
Figure 2:
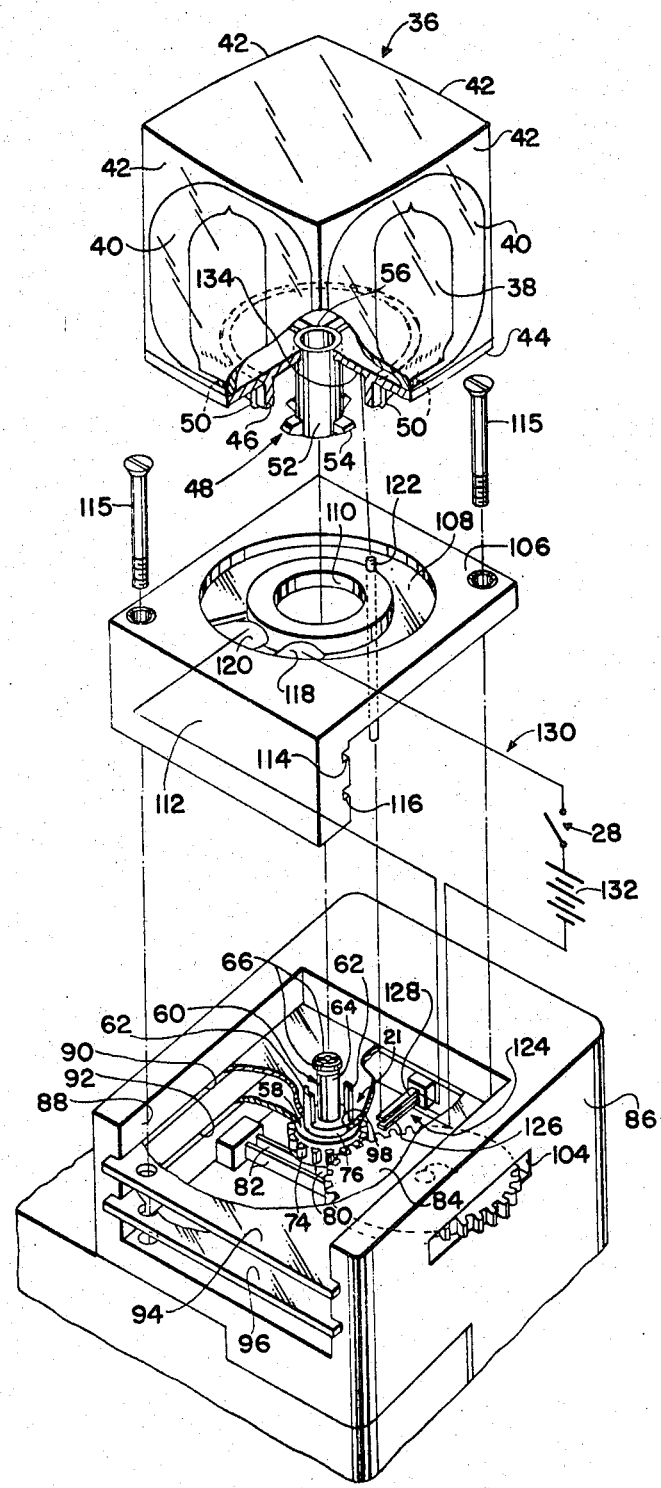
FIG. 2 is an exploded, partially cut away, perspective view of the preferred embodiment shown in FIG. 1.

One example of circuitry usable in conjunction with this invention is designated 130 in FIG. 2. Terminals 120 and 118 are for electrically connecting a flashbulb in series with switch 28 and a source of electromotive force designated 132. Circuit means 130 also involves switch 124 shown in FIG. 3. Switch 124 includes terminal 126 and resilient terminal 128, terminal 128 being resiliently biased out of contact with terminal 126 to open switch 124 and being capable of deflection into contact with terminal 126 by pin 122 to close switch 124. Switch 124 extends from the inner walls of open chamber 88 between plates 94 and 96 and, when unit 36 is mounted on or removed from the camera, pin 122 operates the switch. As shown in FIG. 3, switch 124 constitutes a safety switch to maintain circuit means 130 in an open condition in the event of inadvertent electrical contact between terminals 120 and 118 during photography in the absence of a multilamp unit.

Switch means operable in response to the mounting and removal of a multilamp unit may have other uses. For example, in a camera involving electronic circuitry for controlling exposure interval duration, a switch sensitive to multilamp unit presence may operate to influence the operation of the aforesaid exposure control circuitry in accordance with unit presence and absence. One example of photographic apparatus involving use of such a multilamp unit sensitive switch is disclosed in U. S. Patent application Ser. No. 716,051, filed Mar. 26, 1968, in the name of Bruce K. Johnson.

Operation of the apparatus will now be described.

In an initial position, cantilever springs 82 acting upon extension 80 maintain rotatably mounted member 21 in one of four angular positions. Springs 82 are biased toward each other for firm engagement with opposed planar sides of square extension 80. This action continuously urges member 21, as aforesaid, into one of four angular positions. The planar surfaces of extension 80, springs 82 and leaf-like members 62 are oriented relative to each other to cause one face of a multilamp unit held by the rotatably mounted member to be directed toward the scene to be photographed when any pair of opposed surfaces of extension 80 are firmly engaged by springs 82. Referring to FIG. 2, it can be seen that lugs 54 of unit 36 extend outwardly from post 52 in a direction normal to the plane of faces 42. When the unit is oriented for directing one face forwardly, toward a scene to be photographed, a lug extends forwardly. To mount the unit in this orientation, opposed sides of extension 80 are firmly engaged by springs 82 and leaf-like members 62 are positioned substantially over opposed diagonal corners of extension 80. In this manner, the forwardly directed portion of base 58 is free to receive the forwardly directed lug and each member 62 is positioned for location between opposed pairs of lugs.

A multilamp unit is mounted on the camera by bringing hollow post 52 into alignment with bifurcated projecting member 60 so that the projecting member may be inserted into the hollow post. Beveled surfaces 70 on detent means 66 initially contact hollow post 52 and cause deflection of prongs 64 inward toward each other. As the projecting member is inserted into post 52, surfaces 72 of detent means 66 engage the inner surface of the post and exert a radial outwardly directed force thereon. When the multilamp unit is moved to its fully mounted position, detent means 66 expands due to release of the outwardly directed force and retentively engages the unit. In the apparatus of FIG. 3, the end of bifurcated projecting member 60 bearing detent means 66 passes entirely through the hollow post to engageable shoulder 56. Prongs 64 of the projecting member then spring outwardly and bring detent means 66 into releasable retentive engagement with shoulder 56. Lead-in wire supporting ring 46 seats in channel 108 to enable successive pairs of lead-in wires 50 to contact terminals 118 and 120. Leaf-like members 62 extend upwardly from base 58 of the rotatably mounted member for location along opposed portions of hollow post 52, between opposed pairs of outwardly extending lugs 54 to effect proper angular orientation of the unit and subsequently impart rotation thereto.

The mounting of the multilamp unit on the camera causes portion 134 of support 44 to depress elongated pin 122 to thereby deflect resilient terminal 128 into contact with terminal 124 and close switch 126. When the unit is positioned so that one face is directed forwardly, toward the scene to be photographed, lead-in wires 50 of the lamp 38 in the aforesaid one face contact terminals 118 and 120 so that circuit 130 may be completed through the lamp.

The system, including the photographic flash assembly and the multilamp unit, remain in this position, at rest, until the camera is operated to produce a photographic exposure. Actuating means 14 operates the shutter mechanism to permit light to pass along the optical axis of lens 18 for exposing photosensitive sheet material in camera body 16. In timed relationship to exposure production, projection 26 of button 22 deflects terminal 30 into contact with terminal 32 to close switch 28. Closure of switch 28 completes circuit 130 to ignite the flash lamp directed toward the scene to be photographed, exposure production and the flash of light occuring substantially simultaneously. After exposure production, actuating means 14 is released and spring means 34 returns it to a raised position wherein projection 26 moves away from terminal 30 to permit switch 28 to open.

In preparation for a subsequent photographic exposure, a fresh flash lamp must be included in circuit 130 and directed toward the scene to be photographed. The portion of gear 84 extending through opening 104 is manually rotated about axle 102. Rotation of gear 84 rotates gear 74 to rotate member 21. Rotation of member 21 causes square extension 80 to turn so that one pair of opposing sides of extension 80 will move out of engagement between springs 82 and diagonally opposed corners will deflect springs 82. When opposed diagonal corners of the extension pass an overcenter position between deflected springs 82, the springs then tend to relax and urge member 21 to continue rotation until the springs firmly engage another pair of opposed surfaces of extension 80.

The square cross-sectional configuration of member 80 corresponds to the four sides of the multilamp assembly and each turning movement of member 21 is thereby a 90° rotation appropriate for directing successive faces of the assembly toward a scene to be photographed.

Subsequent to completion of the turning movement, the assembly is positioned for another photographic exposure production and flash lamp ignition.

When all the lamps in the unit have been ignited, the unit may be withdrawn by manually pulling it in a direction substantially along the longitudinal axis of projecting member 60. In this manner, beveled surface 68 of detent means 66 is drawn along shoulder 56 to deflect prongs 64 inwardly toward each other so that the detent means may pass through hollow post 52. During withdrawal of unit 36, leaf-like members 62 are drawn from between lugs 54 and surface 134 releases pin 122 to permit resilient terminal 28 to return to a position out of contact with terminal 126 to open switch 124. When prongs 64 are completely withdrawn from post 52, they spring apart to a rest position. The assembly is now ready for installation of a subsequent multilamp unit and further operation.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A photographic flash assembly for use with a multilamp photoflash unit including a base, the upper side of which supports a plurality of photoflash lamps and individual reflectors with corresponding lead-in wires extending to a lower side of said base, said lower side including a hollow post depending therefrom, said post having a plurality of spaced radially extending lugs near the free end thereof, the flash assembly comprising in combination:

a rotatably mounted member including projecting means insertable within said hollow post, said projecting means exerting a radial outwardly directed force on the inner surface of said hollow post during insertion into said post, releasably engaging said multilamp unit and having an outwardly extending beveled surface configured to retain said assembly against movement from forces upwardly exerted from said lower side when fully inserted thereinto, for releasably retaining said multilamp unit on said flash assembly;

means rotatable with said member for engaging at least one of said radially extending lugs for rotating said multilamp photoflash unit when said member is rotated; and resilient means, including electrical circuit completing means engageable with said photoflash unit lower side, said resilient means being oriented for applying said upwardly exerted forces against said photoflash unit lower side when said rotatably mounted member is fully inserted within said hollow post, so as to promote a laterally stable mounting thereof.

2. Apparatus according to claim 1 wherein said projecting means comprises a plurality of resilient prongs, each of which is capable of exerting a radial outwardly directed force on the inner surface of said hollow post when inserted thereinto.

3. Apparatus according to claim 1 wherein said projecting means comprises a bifurcated projecting member formed having prongs, each prong of which is capable of exerting a radial outwardly directed force on the inner surface of said hollow post when inserted thereinto.

4. A photographic flash assembly for use with a multilamp photoflash unit including a base, the upper side of which supports a plurality of photoflash lamps and individual reflectors with corresponding lead-in wires extending to a lower side of said base, said lower side including a hollow post depending therefrom, said post having a plurality of spaced radially extending lugs near the free end thereof and a shoulder portion opposite said free end, the flash assembly comprising in combination:

a rotatably mounted member comprising:

a plurality of resilient prongs for simultaneous insertion into said hollow post, detent means on each of said resilient prongs including a beveled surface for engaging a said shoulder portion of said hollow post to exert thereupon a radially outwardly directed force and to retain said assembly against movement from forces upwardly exerted from said lower side when said detent means is fully inserted within said hollow post, for releasably retaining said multilamp unit on said flash assembly, means rotatable with said member for engaging at least one of said radially extending lugs for rotating said multilamp unit when said member is rotated; and resilient means, including electrical circuit completing means engageable with said photoflash unit lower side, said resilient means being oriented for applying said upwardly exerted forces against said photoflash unit lower side when said rotatably mounted member resilient prongs are fully inserted within said hollow post, so as to promote a laterally stable mounting of said photoflash unit.

5. A photographic flash assembly for use with a multilamp photoflash unit incluidng a base, the upper side of which supports a plurality of photoflash lamps and individual reflectors with corresponding lead-in wires extending to a lower side of said base, said lower side including a hollow post depending therefrom, said post having a plurality of spaced radially extending lugs near the free end thereof, the flash assembly comprising in combination:

a rotatably mounted member including projecting means insertable within said hollow post, said projecting means including detent means having an outwardly extending beveled surface for engaging a portion of said multilamp unit from within said hollow post and configured to retain said assembly against movement from forces upwardly exerted from said lower side when said projecting means is fully inserted within said post;

means rotatable with said member for engaging at least one of said radially extending lugs for rotating said multilamp photoflash unit when said member is rotated; and resilient means including electrical circuit completing means engageable with said photoflash unit lower side, said resilient means being oriented for applying said upwardly exerted forces against said photoflash unit lower side when said projecting means is fully inserted within said hollow post, for promoting a laterally stabilized mounting of said multilamp photoflash unit.

\* \* \* \* \*